US008761061B2

(12) United States Patent
Choi et al.

(10) Patent No.: US 8,761,061 B2
(45) Date of Patent: Jun. 24, 2014

(54) APPARATUS AND METHOD FOR TRANSMITTING/RECEIVING DATA IN COMMUNICATION SYSTEM

(75) Inventors: In-Kyeong Choi, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 196 days.

(21) Appl. No.: 13/336,832

(22) Filed: Dec. 23, 2011

(65) Prior Publication Data

US 2012/0163258 A1 Jun. 28, 2012

(30) Foreign Application Priority Data

Dec. 23, 2010 (KR) .................... 10-2010-0133974
Dec. 22, 2011 (KR) .................... 10-2011-0140064

(51) Int. Cl.
*H04B 7/00* (2006.01)
(52) U.S. Cl.
USPC ............................................ 370/310
(58) Field of Classification Search
CPC ....... H04L 1/0025; H04L 5/14; H04L 5/0048; H04W 8/26; H04W 88/08; H04W 84/12
USPC ............ 370/310, 277, 279, 292, 208, 209, 370/310.2, 313, 335, 315, 328, 331, 338, 370/334; 375/260, 267, 295; 455/69, 517
See application file for complete search history.

(56) References Cited

U.S. PATENT DOCUMENTS

| 8,472,545 B2 * | 6/2013 | Wu et al. .................. 375/267 |
| 2011/0158335 A1 * | 6/2011 | Lee et al. .................. 375/260 |

OTHER PUBLICATIONS

Taesang Yoo et al., "On the Optimality of Multiantenna Broadcast Scheduling Using Zero-Forcing Beamforming", IEEE Journal on Selected Areas in Communications, Mar. 2006, pp. 528-541, vol. 24, No. 3, IEEE.

* cited by examiner

*Primary Examiner* — Chi Pham
*Assistant Examiner* — Alexander O Boakye

(57) ABSTRACT

Disclosed is an apparatus for transmitting data in a communication system, including: a receiving unit configured to receive signals from multi-users by a multi-user-multi input multi output (MIMO) scheme and acquire channel information from the users; a calculation unit configured to calculate precoding vectors for the users using the channel information; a precoding unit configured to precode data of the users using the precoding vectors; and a transmitting unit configured to transmit the precoded data to users by the multi user-MIMO scheme.

16 Claims, 2 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2010-0133974 and 10-2011-0140064, filed on Dec. 23, 2010, and Dec. 22, 2011, respectively, which are incorporated herein by reference in their entirety.

BACKGROUND OF THE INVENTION

1. Field of the Invention

Exemplary embodiments relate to a communication system, and more particularly, to an apparatus and a method for transmitting/receiving data by applying precoding having low complexity in a communication system providing services to multi-users by a multi-input multi-output (hereinafter, referred to as 'MIMO') scheme.

2. Description of Related Art

In a current communication system, research for providing services having various quality of services (hereinafter, referred to as 'QoS') to users at a high transmission rate has been actively conducted. As an example of the communication system, in a wireless local area network (hereinafter, referred to as 'WLAN') system, research into methods for stably transmitting large-capacity data at high rate through limited resources has been actively conducted. In particular, in a communication system, research into data transmission through a wireless channel has been conducted. Recently, methods for allowing the WLAN system to normally transmit and receive large-capacity data by effectively using a limited wireless channel have been proposed.

Meanwhile, as a demand for a high-rate communication system capable of processing and transmitting large-capacity data at high rate through limited resources, for example, a wireless channel in a communication system is required, there is a need to increase efficiency of a system using a channel encoding scheme suitable for a system. Further, errors may inevitably occur and information may be lost, at the time of transmitting data according to channel environment present in the communication system. As one example of a method for maximizing channel transmission capacity while stably transmitting large-capacity data at high rate by minimizing the information loss in the communication system, a method for transmitting and receiving data by applying the precoding in the communication system has been proposed.

However, in the current communication system, when intending to transmit the large-capacity data, in particular, transmit the large-capacity data to the multi-users, there is a limitation in normally transmitting and receiving the large-capacity data at high rate due to high complexity caused when applying precoding to a data packet, for example, a multi-users data packet, including the large-capacity data to be transmitted to the multi-users and then, transmitting the data packet. In other words, maximizing channel transmission capacity in consideration of all the users of a basic service set (hereinafter, referred to as BSS) by applying the precoding in the communication system significantly increases the complexity at the time of selection of a user, such that it is difficult to apply the precoding to a system for transmitting and receiving the large-capacity data from and to the multi-users.

Therefore, a need exists for a method for normally transmitting and receiving the large-capacity data to the multi-users at high rate through the limited resources by applying the precoding having the low complexity in the communication system, for example, the WLAN system.

SUMMARY OF THE INVENTION

An embodiment of the present invention is directed to a system and a method for transmitting and receiving data in a communication system.

Another embodiment of the present invention is directed to an apparatus and a method for normally transmitting and receiving large-capacity data to and from multi-users at high rate by applying precoding having low complexity in a communication system providing services to the multi-users by an MIMO scheme.

Still another embodiment of the present invention is directed to an apparatus and a method for normally transmitting and receiving large-capacity data to and from multi-users by maximizing channel transmission capacity by applying precoding having low complexity in a communication system providing services to the multi-users by an MIMO scheme.

In accordance with an embodiment of the present invention, an apparatus for transmitting data in a communication system includes: a receiving unit configured to receive signals from multi-users by a multi-user-multi input multi output (MIMO) scheme and acquire channel information from the users; a calculation unit configured to calculate precoding vectors for the users using the channel information; a precoding unit configured to precode data of the users using the precoding vectors; and a transmitting unit configured to transmit the precoded data to users by the multi user-MIMO scheme.

In accordance with another embodiment of the present invention, a method for transmitting data in a communication system includes: receiving signals from multi-users by a multi-user-multi input multi output (MIMO) scheme and acquire channel information from the users; calculating precoding vectors for the users using the channel information; precoding data of the users using the precoding vectors; and a transmitting unit configured to transmit the precoded data to users by the multi user-MIMO scheme.

DESCRIPTION OF SPECIFIC EMBODIMENTS

Figure 1:
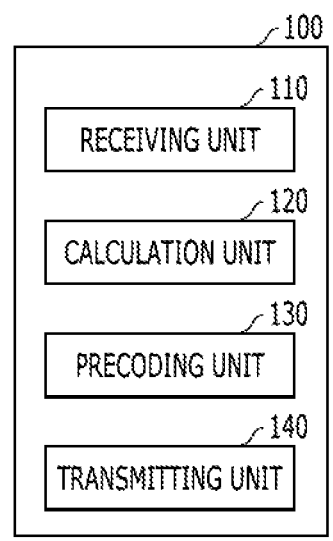
FIG. 1 is a diagram schematically illustrating a structure of an apparatus for transmitting data in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An embodiment of the present invention proposes an apparatus and a method for transmitting and receiving data in a communication system, for example, a wireless local area network (hereinafter, referred to as "WLAN") system. Herein, even though the embodiment of the present invention describes an example of the WLAN system, a method for transmitting and receiving data proposed in the embodiment of the present invention may be applied to other communication systems.

In addition, the embodiments of the present invention applies precoding having low complexity in a communication system providing services to multi-users by a multi-input multi-output (hereinafter, referred to as 'MIMO') scheme to maximize transmission channel capacity for multi-users within a basic service set (referred to as 'BSS'), thereby normally transmitting and receiving the large-capacity data at high rate.

Here, the communication system in accordance with the embodiment of the present invention, for example, the WLAN system transmits and receives data by the multi user-MIMO scheme. In this case, the users are selected so as to maximize the channel transmission capacity of multi-users within the BSS by applying precoding having low complexity and precoding weights, that is, precoding vectors for each selected user are each calculated. Further, as described above, the WLAN system in accordance with the embodiment of the present invention performs zero-foring beamforming (hereinafter, referred to as 'ZFBF') by applying the precoding vectors calculated for each of the multi-users, thereby normally transmitting and receiving large-capacity data at high rate by a multi user-MIMO scheme. Here, an apparatus for transmitting data in a communication system in accordance with the embodiments of the present invention will be described in more detail with reference to FIG. 1.

FIG. 1 is a diagram schematically illustrating a structure of an apparatus for transmitting data in a communication system in accordance with an embodiment of the present invention. FIG. 1 is a diagram schematically illustrating a structure of an AP in the WLAN system in accordance with the embodiment of the present invention.

Referring to FIG. 1, an apparatus for transmitting data may include a receiving unit 110 receiving data from multi-users by a multi user-MIMO scheme, a calculation unit 120 calculating the precoding weights for maximizing the transmission channel capacity by applying the precoding having low complexity at the time of transmitting large-capacity data to the multi-users; a precoding unit 130 applying the ZFBF precoding using the precoding weights for the multi-users, and a transmitting unit 140 transmitting the data to which the ZFBF precoding is applied by the multi user MIMO scheme.

Here, the communication system in accordance with the embodiment of the present invention, for example, the WLAN system supports the multi user-MIMO scheme and thus, allows the transmitting unit 140 and the receiving unit 110 to transmit and receive data to and from the multi-users by the multi user-MIMO scheme. In this case, the receiving unit acquires channel information between the multi-users and the AP and acquires the channel transmission capacity for the multi-users through the channel information. Further, the calculation unit 120 calculates precoding weights for the multi-users using the channel information so as to simultaneously transmit data streams to the multi-users while minimizing the inter-user interference. The precoding unit 130 performs the ZFBF precoding on the data streams to be transmitted to the uses by using calculated precoding weights to maximize the channel transmission capacity, thereby normally the large-capacity data to the multi-users at high rate. Hereinafter, an operation of the calculation unit 120 and the precoding unit 130 will be described below in more detail.

First, the calculation unit 120 uses transmitting channel information of all the users to sequentially determine users transmitting data, thereby minimizing the interference between the multi-users. In this case, the calculation unit 120 updates a user channel by using a Gram-Schmidt orthogonalization process that is semiorthogonal user selection (hereinafter, referred to as 'SUS') so as to make all the channels orthogonal to the previously selected user channel and then, sequentially selects users using a large amount of power in the updated user channel, thereby calculating the precoding weights for the multi-users.

For example, describing in more, when K users are present in a single BSS region, the apparatus for transmitting data, that is, the AP has M transmit antennas, and user k within the BSS, that is, a terminal as an apparatus for receiving data, for example, station (hereinafter, referred to as 'STA') k has a Nk receive antenna (hereinafter, for convenience of explanation, provided that Nk=1 for all the Ks), a channel vector of the STA k may be represented by hk=[hk1, hk2 . . . hkm]. Here, when a set of all the users within the BSS is T and a set of users selected to transmit and receive data by the multi user-MIMO scheme is U, it is initialized as T={1, 2, . . . , K}, U=Ø, gk=hk.

Here, when any m-th user among multi-users is used, the orthogonal component gk of hk in a subspace may be represented by Equation 1 by $\{g_{u_1}, \ldots, g_{u_{m-1}}\}$ orthogonal to all of the users k∈T\{u_1, . . . , u_{m-1}}. In this case, the m-th user $u_m$ satisfying Equation 2 is selected (m=1, . . . , M).

$$g_k = h_k - h_k \sum_{j=1}^{m-1} \frac{g_{u_j}^*}{\|g_{u_j}\|^2} g_{u_j} \qquad \text{[Equation 1]}$$

$$u_m = \underset{k \in T\setminus\{u_1,\ldots,u_{m-1}\}}{\arg\max} \{\|g_k\|^2\} \qquad \text{[Equation 2]}$$

Here, the channel selected in the multiple user channel becomes $h_{u_m}$, the orthogonal component of the selected channel becomes $g_{u_m}$, a set of the selected users is updated to U={u_1, . . . , u_m}, and a set of the remaining users is also updated to T/U. The user channel for the M users finally selected by repeatedly performing the process becomes $H_0 = [h_{u_1}^T h_{u_2}^T \ldots h_{u_M}^T]^T$ and Ho according to Equation 1 may be matrix-decomposed like Equation 3.

$$H_o = DRQ \qquad \text{[Equation 3]}$$

$$D = \text{diag}\{\|g_{u_1}\|, \ldots, \|g_{u_M}\|\}$$

$$R = \begin{bmatrix} 1 & 0 & \cdots & 0 \\ \frac{h_{u_2} g_{u_1}^*}{\|g_{u_2}\|\|g_{u_1}\|} & 1 & \cdots & 0 \\ \vdots & \vdots & \ddots & \vdots \\ \frac{h_{u_M} g_{u_1}^*}{\|g_{u_M}\|\|g_{u_1}\|} & \cdots & \frac{h_{u_M} g_{u_{M-1}}^*}{\|g_{u_M}\|\|g_{u_{M-1}}\|} & 1 \end{bmatrix}$$

$$Q = \begin{bmatrix} \frac{g_{u_1}^*}{\|g_{u_1}\|} \\ \vdots \\ \frac{g_{u_M}^*}{\|g_{u_M}\|} \end{bmatrix}$$

In Equation 3, Q is a unitary matrix and the selected multiple user channels becomes Ho. As described above, data are transmitted and received by the multiple user-MIMO scheme.

In this case, the selected multiple user channel $H_o$ by Equation 3 has an inverse matrix by performing the ZFBF precoding and therefore, the precoding weight for the ZFBF precoding, that is, the precoding vector $W_o$ may be represented by Equation 4.

$$W_o = Q^* R^{-1} D^{-1}$$

In this case, in order to perform the ZFBF precoding using the precoding vector $W_o$ obtained from Equation 4, the precoding vector $W_o$ needs to be calculated. In order to calculate the precoding vector Wo, the user intending to perform the ZFBF precoding is selected and then, the inverse matrix $D^{-1}$, $R^{-1}$, and $Q^*$ are each calculated and a matrix product of the calculated matrices needs to be calculated. In particular, $h_k$ and $g_k$ are complex vectors and thus, complexity is considerably increased when applying the precoding according to the calculation of, $h_k g_i^*$ and $$\frac{g_k^*}{\|g_{u_k}\|}.$$

Therefore, after calculating the precoding weight by the aforementioned schemes, that is, calculating the precoding weight by the SUS scheme, there is a limitation in transmitting large-capacity data to the multi-users by the multiple user-MIMO scheme.

Accordingly, in the WLAN system in accordance with the embodiment of the present invention, after all the users for applying the ZFBF precoding are selected at the time of calculating the precoding vector $W_o$ by the SUS scheme, the precoding vector $W_o$ is not calculated by the matrix calculation and the precoding vector $W_o$ calculated at the time of sequentially selecting the users, that is, the precoding vector $W_o$ of the previous user calculated at the time of selecting the previous user is updated, which is used to calculate the precoding vector $W_o$ of the next user by selecting the next user. That is, the precoding vector $W_o$ corresponding to the previous user is updated, which is used to calculate the precoding vector $W_o$ corresponding to the next user.

That is, in order to normally transmit and receive the large-capacity data at high rate by the multiple user-MIMO scheme, the calculation unit 130 of the WLAN system in accordance with the embodiment of the present invention first selects a first user having the largest channel transmission capacity within the BSS and calculates the precoding vector $W_o$ for the selected first user. Thereafter, the calculation unit 130 updates the precoding vector $W_o$ for the first user at the time of calculating the precoding vector $W_o$ for a second user to calculate the precoding vector $W_o$ for the second user. When all the precoding vectors $W_o$ for the multi-users are calculated, the precoding unit 130 performs the ZFBF precoding using the calculated precoding vector $W_o$ and thus, the apparatus for transmitting data in the WLAN in accordance with the present invention, that is, the AP applies the precoding having low complexity to maximize the channel transmission capacity and normally transmit the large-capacity data to the multi-users at high rate.

Describing in more detail, when the multiple user channel selected to transmit data by the multiple user-MIMO scheme is H, the precoding vector W for performing the ZFBF precoding becomes $W = H^*(HH^*)^{-1}$. Here, when the ZFBF precoding is performed on two users as an example, if the first user channel primarily selected is $h_1$, $g_1 = h_1$ and the precoding vector for the first user becomes $$W = w_1 = \frac{g_1^*}{\|g_1\|^2}$$

by the ZFBF precoding for a single user. Here, in order to add the newly selected second user channel $h_2$, it needs to satisfy Equation 2. In this case, the orthogonal components of two user channels $h_1$ and $h_2$ become $g_1 = h_1$ and $$g_2 = h_2 - h_2 \frac{g_1^*}{\|g_1\|^2} g_1.$$

Here, the selected two user channels $h_1$ and $h_2$ may be represented by $H = [h_1^T \ h_2^T]^T$ and the precoding vector for the selected two user channels may be represented by $W = [w_1 \ w_2]$. Here, the precoding vector $w_1$ of the first user channel and the precoding vector $w_2$ of the second user channel may be represented by $$w_1 = \frac{h_1^* \|h_2\|^2 - h_2^* h_2 h_1^*}{\|h_1\|^2 \|h_2\|^2 - h_1 h_2^* h_2 h_1^*}, \quad w_2 = \frac{h_2^* \|h_1\|^2 - h_1^* h_1 h_2^*}{\|h_1\|^2 \|h_2\|^2 - h_1 h_2^* h_2 h_1^*}$$

In this case, the precoding vector $w_1$ of the first user and the precoding vector $w_2$ of the second user channel may be represented by Equation 5 using the orthogonal components of each channel.

[Equation 5]

$$w_2 = \frac{\|h_1\|^2 \left(h_2^* - \frac{h_1^* h_1 h_2^*}{\|h_1\|^2}\right)}{\|h_1\|^2 \left(\|h_2\|^2 - \frac{h_1 h_2^* h_2 h_1^*}{\|h_1\|^2}\right)} = \frac{\left(h_2^* - \frac{g_1^* g_1 h_2^*}{\|g_1\|^2}\right)}{\left(\|h_2\|^2 - \frac{h_2 g_1^* g_1 h_2^*}{\|g_1\|^2}\right)}$$

$$= \frac{g_2^*}{\|g_2\|^2},$$

$$w_1 = \frac{h_1^* \left(\|h_2\|^2 - \frac{h_1 h_2^* h_2 h_1^*}{\|h_1\|^2}\right) - \left(h_2^* h_2 h_1^* - \frac{h_1^* h_1 h_2^* h_2 h_1^*}{\|h_1\|^2}\right)}{\|h_1\|^2 \left(\|h_2\|^2 - \frac{h_1 h_2^* h_2 h_1^*}{\|h_1\|^2}\right)} = \frac{h_1^*}{\|h_1\|^2} - \frac{h_2 h_1^* \left(h_2^* - \frac{h_1^* h_1 h_2^*}{\|h_1\|^2}\right)}{\|h_1\|^2 \left(\|h_2\|^2 - \frac{h_2 h_1^* h_1 h_2^*}{\|h_1\|^2}\right)}$$

$$= \frac{g_1^*}{\|g_1\|^2} - \frac{h_2 g_1^* g_2^*}{\|g_1\|^2 \|g_2\|^2}$$

Here, in FIG. 5, the precoding vector $w_1$ of the first user primarily selected is affected by the interference due to the second user according to the addition of the newly selected second user. In other words, when only the first user is selected, the precoding vector of the first user is $$w_1 = \frac{g_1^*}{\|g_1\|^2},$$

but when the second user is newly added, the precoding vector of the first user is updated to $$w_1 = w_1 - h_2 \frac{g_1^*}{\|g_1\|^2} w_2.$$

In this case, $$\alpha = h_2 \frac{g_1^*}{\|g_1\|^2}$$

according to the effect of interference due to the second user becomes a scaling value of the precoding vector $w_2$ of the second user, that is, the reduced value by an inner product of the newly selected second user channel and the precoding vector of the previous first user. When the precoding vector for the M users is calculated by selecting any M users by the aforementioned scheme, the sequential selection of the users and the calculation of the precoding vector of the selected user will be described below in more detail.

First, when data are transmitted to the M users by the multiple user-MIMO scheme, as described above, in order to maximize the channel transmission capacity, the first user having the maximum channel transmission capacity among the M users, that is, the first user satisfying $$u_1 = \underset{k \in T}{\operatorname{argmax}}\{\|g_k\|^2\}$$

is selected by Equation 2 according to m=1 from the initialized $g_k = h_k$, $k \in T = \{1, \ldots, K\}$. In this case, a set of users becomes $U = \{u_1\}$ according to the selection of only the first user.

Further, as described above, the precoding vector of the first user becomes $$w_1^{(1)} = \frac{g_{u_1}^*}{\|g_{u_1}\|^2}.$$

In this case, the precoding vector $$w_1^{(1)} = \frac{g_{u_1}^*}{\|g_{u_1}\|^2}$$

of the first user is calculated through $\|g_k\|^2$, $k \in T$ which is calculated at the time of selecting the first user and therefore, has low complexity in calculating the precoding vector $w_1^{(1)}$ of the first user.

In addition, after calculating the precoding vector of the first user, $$g_k = h_k - h_k \frac{g_{u_1}^*}{\|g_{u_1}\|^2} g_{u_1},$$

$k \in T | \{u_1\}$ is calculated by updating the precoding vector $$w_1^{(1)} = \frac{g_{u_1}^*}{\|g_{u_1}\|^2}$$

of the first user for the remaining users that are not selected at m=1 by Equations 1 and 2 according to m=2 and then, the second user having the maximum channel transmission capacity subsequent to the first user is selected among the remaining users, that is, the second user satisfying $$w_3^{(3)} = \frac{g_{u_3}^*}{\|g_{u_3}\|^2}$$

$$u_2 = \underset{k \in T|\{u_1\}}{\operatorname{argmax}}\{\|g_k\|^2\}$$

is selected. In this case, a set of users becomes $U = \{u_1, u_2\}$.

Further, as described above, the precoding vector of the newly selected second user becomes $$w_2^{(2)} = \frac{g_{u_2}^*}{\|g_{u_2}\|^2}.$$

In this case, the precoding vector $$w_2^{(2)} = \frac{g_{u_2}^*}{\|g_{u_2}\|^2}$$

of the second user is calculated through $\|g_k\|^2$, $k \in T|\{u_1\}$ calculated at the time of selecting the second user by updating the precoding vector $$w_1^{(1)} = \frac{g_{u_1}^*}{\|g_{u_1}\|^2}$$

of the first user and therefore, has low complexity at the time of calculating the precoding vector $w_2^{(2)}$ of the second user.

Here, the precoding vector $$w_2^{(2)} = \frac{g_{u_2}^*}{\|g_{u_2}\|^2}$$

of the second user is calculated by updating the precoding vector $$w_1 = \frac{g_1^*}{\|g_1\|^2}$$

of the first user and therefore, the precoding vector $$w_1 = \frac{g_1^*}{\|g_1\|^2}$$

of the first user is updated by the precoding vector $$w_2^{(2)} = \frac{g_{u_2}^*}{\|g_{u_2}\|^2}$$

of the second user. As a result, Equation 5 may be represented by $$w_1^{(2)} = \frac{g_{u_1}^*}{\|g_{u_1}\|^2} - \alpha_1 \frac{g_{u_2}^*}{\|g_{u_2}\|^2}$$

(where $\alpha_1$ is a scalar value).

In other words, if $w_1^{(2)}=w_1^{(1)}-\alpha_1 w_2^{(2)}$, $\alpha_1=h_{u_2}w_1^{(1)}$ according to the ZFBF precoding characteristic ($h_{u_2}w_2^{(2)}=1$, $h_{u_2}w_1^{(2)}=0$) and thus, $w_1^{(2)}=w_1^{(1)}-h_{u_2}w_1^{(1)}w_2^{(2)}$ is represented by Equation 5. Here, the complexity in calculating the precoding vector $w_1^{(2)}$ of the first user by the update of the precoding vector $w_2^{(2)}$ of the second user becomes low.

In addition, after calculating the precoding vector of the first user and the second user, the third user having the maximum channel transmission capacity subsequent to the second user at the remaining users is selected by updating the precoding vector $$g_k = h_k - h_k\left(\frac{g_{u_1}^*}{\|g_{u_1}\|^2}g_{u_1} + \frac{g_{u_2}^*}{\|g_{u_2}\|^2}g_{u_2}\right),$$

$k \in T \setminus \{u_1, u_2\}$ of the first user and the second user for the remaining users that are not selected by Equations 1 and 2 according to m=3, that is, the third user satisfying $$u_3 = \underset{k \in T \setminus \{u_1, u_2\}}{\operatorname{argmax}} \{\|g_k\|^2\}$$

is selected. In this case, a set of users becomes $U=\{u_1, u_2, u_3\}$.

Further, as described above, the precoding vector of the newly selected third user becomes $$w_3^{(3)} = \frac{g_{u_3}^*}{\|g_{u_3}\|^2}.$$

In this case, the precoding vector $$w_3^{(3)} = \frac{g_{u_3}^*}{\|g_{u_3}\|^2}$$

of the third user is calculated through $\|g_k\|$, $k \in T \setminus \{u_1, u_2\}$ calculated at the time of selecting the third user by updating the precoding vector $$g_k = h_k - h_k\sum_{m=1}^{M-1}\frac{g_{u_m}^*}{\|g_{u_m}\|^2}g_{u_m},$$

$k \in T \setminus \{u_1, u_2, \ldots u_{M-1}\}$ of the first user and the second user and therefore, has low complexity at the time of calculating the third precoding vector $w_3^{(3)}$.

Here, the precoding vector $$w_3^{(3)} = \frac{g_{u_3}^*}{\|g_{u_3}\|^2}$$

of the third user is calculated by updating the precoding vector $$g_k = h_k - h_k\sum_{m=1}^{M-1}\frac{g_{u_m}^*}{\|g_{u_m}\|^2}g_{u_m},$$

$k \in T \setminus \{u_1, u_2, \ldots u_{M-1}\}$ of the first user and the second user and therefore, as described above, at m=2, the precoding vector $W_1^{(2)}$ of the first user and the precoding vector $w_2^{(2)}$ of the second user are also updated by the precoding vector $$g_k = h_k - h_k\left(\frac{g_{u_1}^*}{\|g_{u_1}\|^2}g_{u_1} + \frac{g_{u_2}^*}{\|g_{u_2}\|^2}g_{u_2}\right),$$

$k \in T \setminus \{u_1, u_2\}$ of the third user.

In other words, in order to update the precoding vector $w_1^{(2)}$ of the first user and the precoding vector $w_2^{(2)}$ of the second user through the precoding vector $w_3^{(3)}$ of the third user, if $w_2^{(3)}=w_2^{(2)}-\alpha_2 w_3^{(3)}$, $w_1^{(3)}=w_1^{(2)}-\alpha_1 w_3^{(3)}$ (where $\alpha_1$ and $\alpha_2$ are scalar values), it becomes a form subtracting the newly selected precoding vector $w_3^{(3)}$ of the third user newly selected from the precoding vector of the previously selected user, that is, the precoding vector $w_1^{(2)}$ and the precoding vector $w_2^{(2)}$ of the second user, that is, the reduced value. Here, as described above, $\alpha_2=h_{u_3}w_2^{(2)}$, $\alpha_1=h_{u_3}w_1^{(2)}$ by the ZFBF precoding characteristic ($h_{u_3}w_3^{(3)}=1$, $h_{u_3}w_2^{(3)}=0$, $h_{u_3}w_3^{(3)}=0$) and therefore, $w_1^{(3)}=w_1^{(2)}-h_{u_3}w_1^{(2)}w_3^{(3)}$, $w_2^{(3)}=w_2^{(2)}-h_{u_3}w_2^{(2)}w_3^{(3)}$ is represented by Equation 5. The complexity in calculating the precoding vector $w_1^{(3)}$ of the first user and the precoding vector $w_2^{(3)}$ of the second user by the update of the precoding vector $w_3^{(3)}$ of the third user becomes low.

$$g_k = h_k - h_k\sum_{m=1}^{M-1}\frac{g_{u_m}^*}{\|g_{u_m}\|^2}g_{u_m},$$

$k \in T \setminus \{u_1, u_2, \ldots u_{M-1}\}$ is updated and a final M-th user having minimum channel transmission capacity is selected, that is, M-th user satisfying $$u_M = \underset{k \in T \setminus \{u_1, u_2, \ldots, u_{M-1}\}}{\operatorname{argmax}} \{\|g_k\|\}$$

is selected. In this case, a set of users becomes $U=\{u_1, u_2, \ldots u_M\}$.

Further, the precoding vector for M users may be represented by Equation 6 by performing an operation of calculating the precoding vector at the time of selecting the new user as described above.

$$w_M^{(M)} = \frac{g_{u_M}^*}{\|g_{u_M}\|^2}$$ [Equation 6]

$$w_{M-1}^{(M)} = w_{M-1}^{(M-1)} - h_{u_M} w_{M-1}^{(M-1)} w_M^{(M)}$$

$$\vdots$$

$$w_1^{(M)} = w_1^{(M-1)} - h_{u_M} w_1^{(M-1)} w_M^{(M)}$$

That is, as described above, the calculation unit 120 in accordance with the embodiment of the present invention calculates the precoding vector for the multi-users transmitting and receiving data by the multiple user-MIMO scheme and then, the precoding unit 130 calculates the final precoding weight used at the time of performing the ZFBF precoding by an vector operation. That is, the calculation unit 120 calculates the final precoding weight $W_o = [w_1^{(M)} w_2^{(M)} \ldots w_M^{(M)}]$ and the precoding unit 130 performs the ZFBF precoding on the data streams to be simultaneously transmitted to the multi-users by using the final precoding weight $W_o = [w_1^{(M)} w_2^{(M)} \ldots w_M^{(M)}]$.

As such, in the WLAN system in accordance with the embodiment of the present invention, in order to apply the precoding having low complexity at the time of transmit and receive the large-capacity data from and to the multi-users by the multiple user-MIMO scheme, as described above, the precoding vector for the next user is calculated by using the precoding vector calculated for the previous user having large channel transmission capacity and the precoding vector for the previous user is updated at the time of calculating the precoding vector of the next user to calculate the precoding weight for the multi-users for performing the ZFBF precoding. Here, an operation for transmitting data in a communication system in accordance with the embodiment of the present invention will be described in more detail with reference to FIG. 2.

Figure 2:
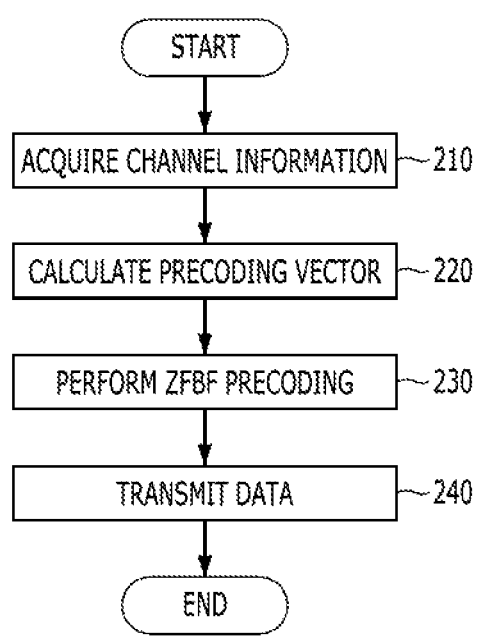
FIG. 2 is a diagram schematically illustrating an operational process of an apparatus for transmitting data in the communication system in accordance with the exemplary embodiment of the present invention.

FIG. 2 is a diagram schematically illustrating an operational process of an apparatus for transmitting data in the communication system in accordance with the embodiment of the present invention. Here, FIG. 2 is a diagram schematically illustrating an operational process of an AP in the WLAN system in accordance with the embodiment of the present invention.

Referring to FIG. 2, the apparatus for transmitting data acquires the channel information with the multi-users transmitting and receiving data by the multiple user-MIMO scheme at S210. Here, the channel transmission capacity for each user is acquired through the acquired channel information.

Further, at S220, the precoding vectors for the multi-users are calculated. Here, the calculation of the precoding vectors for the multi-users is previously described in detail and therefore, the detailed description thereof will be omitted.

Thereafter, at S230, the ZFBF precoding of data to be transmitted to the multi-users is performed by using the precoding vector of the calculated multi-users and then, at S240, data are transmitted to the multi-users by the multiple user-MIMO scheme.

As set forth above, the embodiments of the present invention can apply the precoding having the low complexity at the time of the selection of the user for transmitting and receiving data to and from the multi-users in the communication system providing services to the multi-users by the MIMO scheme, thereby maximizing the channel transmission capacity for all the multi-users while normally transmitting and receiving the large-capacity data to the multi-users at high rate.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, the apparatus comprising:
   a receiving unit configured to receive signals from multiple users by a multi-user-multi input multi output (MIMO) scheme and acquire channel information from the users;
   a calculation unit configured to calculate, using a processor, precoding vectors for the users using the channel information;
   a precoding unit configured to precode, using a processor, the data using the precoding vectors for the users; and
   a transmitting unit configured to transmit the precoded data to the users by the multi user-MIMO scheme,
   wherein the calculation unit sequentially calculates precoding vectors for users sequentially selected from the users, and uses precoding vectors for previously selected users among the users to select a next user and to calculate a precoding vector for the next user.

2. The apparatus of claim 1, wherein the calculation unit selects a first user among the users to calculate a precoding vector for the first user, selects a second user subsequent to selecting the first user using the precoding vector for the first user, and calculates a precoding vector for the second user using the precoding vector for the first user.

3. The apparatus of claim 2, wherein the calculation unit updates the precoding vector for the first user using the precoding vector for the second user.

4. The apparatus of claim 3, wherein the calculation unit uses the updated precoding vector for the first user and the precoding vector for the second user to select a third user subsequent to selecting the second user and to calculate a precoding vector for the third user.

5. The apparatus of claim 4, wherein the calculation unit sequentially selects the first user, the second user, and the third user from the users in consideration of orthogonal components of each user channel through the channel information.

6. The apparatus of claim 5, wherein the calculation unit sequentially selects the users according to channel transmission capacity of the users, a channel of the first user among the users having maximum channel transmission capacity.

7. The apparatus of claim 1, wherein the calculation unit updates the precoding vectors for the previously selected users using the precoding vector for the next user, the updated precoding vectors for the previously selected users having values reduced by the precoding vector for the next user.

8. The apparatus of claim 1, wherein the precoding unit performs zero-foring beamforming (ZFBF) on data streams for the users.

9. A method for transmitting data in a communication system, the method comprising:
   receiving signals from multiple users by a multi-user-multi input multi output (MIMO) scheme to acquire channel information from the users;
   calculating precoding vectors for the users using the channel information;
   precoding the data using the precoding vectors for the users; and transmitting the precoded data to the users by the multi user-MIMO scheme, wherein in the calculating of the precoding vectors, the precoding vectors for the users are sequentially selected, and a next user is selected based on a precoding vector for a previously selected user among the users a precoding vector for the next user being calculated using the precoding vectors for the previously selected users.

10. The method of claim 9, wherein the calculating of the precoding vectors includes:

selecting a first user among the users and calculating a precoding vector for the first user;

selecting a second user subsequent to selecting the first user using the precoding vector for the first user; and calculating a precoding vector for the second user using the precoding vector for the first user.

11. The method of claim 10, wherein the calculating of the precoding vectors further includes updating the precoding vector for the first user using the precoding vector for the second user.

12. The method of claim 11, wherein the calculating of the precoding vectors further includes:

selecting a third user subsequent to selecting the second user using the updated precoding vector for the first user and the precoding vector for the second user; and calculating a precoding vector for the third user using the updated precoding vector for the first user and the precoding vector for the second user.

13. The method of claim 12, wherein in the calculating of the precoding vectors, the first user, the second user, and the third user are selected from the users in consideration of orthogonal components of each user channel through the channel information.

14. The method of claim 13, wherein in the calculating of the precoding vectors, the users are sequentially selected according to channel transmission capacity of the users, and a channel of the first user among the users has maximum channel transmission capacity.

15. The method of claim 9, wherein the calculating of the precoding vectors further includes updating the precoding vectors for the previously selected users using the precoding vector for the next user, the updated precoding vectors for the previously selected users having values reduced by the precoding vector for the next user.

16. The method of claim 9, wherein the precoding of the data includes performing zero-foring beamforming (ZFBF) on data streams for the users.

* * * * *